United States Patent
Wejrzanowski et al.

(10) Patent No.: US 8,118,627 B2
(45) Date of Patent: Feb. 21, 2012

(54) PROPULSION ARRANGEMENT

(75) Inventors: Krzysztof Wejrzanowski, Stamford (GB); Douglas Hay Cartwright, The Old School (GB); Cleveland Mills, Bourne (GB); Nazar Al-Khayat, Columbus, IN (US)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 190 days.

(21) Appl. No.: 12/532,036

(22) PCT Filed: Mar. 18, 2008

(86) PCT No.: PCT/GB2008/000942
§ 371 (c)(1),
(2), (4) Date: Oct. 6, 2009

(87) PCT Pub. No.: WO2008/113999
PCT Pub. Date: Sep. 25, 2008

(65) Prior Publication Data
US 2010/0105259 A1    Apr. 29, 2010

(30) Foreign Application Priority Data
Mar. 19, 2007 (GB) .................................. 0705248.3

(51) Int. Cl.
*B63H 21/20* (2006.01)
(52) U.S. Cl. .................................. 440/3; 322/24; 322/58
(58) Field of Classification Search ........ 440/3; 318/376, 318/400.23; 322/58, 20, 22, 24, 25
See application file for complete search history.

(56) References Cited

U.S. PATENT DOCUMENTS

| | | | |
|---|---|---|---|
| 6,396,161 B1 | 5/2002 | Crecelius et al. | |
| 6,919,711 B2 * | 7/2005 | Haydock et al. | 322/24 |
| 7,518,344 B2 * | 4/2009 | Sihler | 322/58 |
| 2006/0175996 A1 | 8/2006 | Tether | |
| 2006/0244425 A1 | 11/2006 | Sihler | |
| 2009/0156068 A1 * | 6/2009 | Barrett et al. | 440/3 |

FOREIGN PATENT DOCUMENTS

| | | |
|---|---|---|
| EP | 1 415 837 A1 | 5/2004 |
| EP | 1 426 287 A1 | 6/2004 |

(Continued)

OTHER PUBLICATIONS

International Search Report of PCT/GB2008/000942, dated Aug. 28, 2008.
Written Opinion of the International Searching Authority of PCT/GB2008/000942, dated Aug. 28, 2008.

(Continued)

*Primary Examiner* — Lars A Olson
(74) *Attorney, Agent, or Firm* — Hamre, Schumann, Mueller & Larson, P.C.

(57) ABSTRACT

A propulsion arrangement for a marine vessel is disclosed. The propulsion arrangement comprises an engine (12, 14) for propelling the vessel and an electrical machine (26, 28) coupled to the engine. The electrical machine is arranged to supply onboard electrical power for the vessel. A control unit (44) controls the electrical machine such that the electrical machine is selectively operable as a generator or a motor. The control unit and the electrical machine are arranged such that the electrical machine when operating as a motor can supplement the power of the engine while the engine is in operation. In one embodiment, the control unit and the electrical machine are arranged to provide active damping of the engine torque.

14 Claims, 10 Drawing Sheets

FOREIGN PATENT DOCUMENTS

| | | |
|---|---|---|
| GB | 2 326 862 A | 1/1999 |
| GB | 2 342 634 A | 4/2000 |
| JP | 58-203248 A | 11/1983 |
| JP | 2001-301692 A | 10/2001 |
| WO | WO 2006/095042 A1 | 9/2006 |
| WO | WO 2007/075148 A1 | 7/2007 |

OTHER PUBLICATIONS

UK Search Report of Application No. GB 0705248.3, dated Nov. 27, 2007.

UK Further Search Report of Application No. GB 0705248.3, dated Feb. 7, 2008.

* cited by examiner

PROPULSION ARRANGEMENT

The present invention relates to a propulsion arrangement for a marine vessel. In particular, the present invention relates to a propulsion arrangement having an engine for propelling the vessel, and a generator coupled to the engine for producing electrical power for the vessel.

Marine vessels typically comprise an engine connected to a propulsion mechanism, such as a propeller, for propelling the vessel. In addition, many marine vessels require an electrical power supply in order to power onboard electrical equipment. Conventionally such vessels have a separate generator set, comprising an engine and generator, in order to supply the onboard power. However such generator sets tend to be heavy, complex to install, noisy, occupy significant space, and generate fumes, all of which may be particularly undesirable in a marine environment.

In order to avoid the need for a separate generator set, it has been proposed to couple a generator to the engine which provides the vessel's propulsion. In this way the same engine can be used to drive both the propulsion mechanism and the generator which supplies the vessel's onboard electrical power.

A disadvantage of coupling a generator to the engine which provides the vessel's propulsion is that some of the engine's power is taken in driving the generator. This may reduce the maximum propulsion provided by the engine, unless some mechanism for disengaging the generator is provided.

Furthermore marine vessels generally suffer from the disadvantage that their engines need to be sized in accordance with the top speed or maximum acceleration of the vessel. However in practice it is often the case that such vessels operate for much of the time at a cruising speed which is well below the top speed. This may result in inefficient operation of the engine at cruising speeds.

Hybrid propulsion systems have been proposed, in which the power of an internal combustion engine is supplemented by an electric motor when maximum propulsion is required. Such arrangements generally disengage the electric motor when it is not supplying power, for example by means of a clutch, so that the motor does not act as a load on the engine.

A further problem in known propulsion systems is that the engines tend to generate significant amounts of vibration, particularly at low speeds.

According to a first aspect of the present invention there is provided a propulsion arrangement for a marine vessel, comprising:

an engine for propelling the vessel;
an electrical machine coupled to the engine, the electrical machine being arranged to supply onboard electrical power for the vessel; and
a control unit for controlling the electrical machine such that the electrical machine is selectively operable as a generator or a motor;
wherein the control unit and the electrical machine are arranged such that the electrical machine when operating as a motor can supplement the power of the engine while the engine is in operation.

By providing an electrical machine which is selectively operable as a generator or a motor, it is possible to use the same machine both to generate electrical power for the vessel, and to provide additional power to the drive shaft when required. Such an arrangement can thus avoid the need to provide a separate generator and motor. Furthermore, by operating the machine as a motor, it is possible for the machine to present a substantially zero load to the engine (or to assist the engine) when full engine power is required without the need to disengage the machine from the engine. This may reduce the size and weight of the arrangement.

Prior art arrangements have typically used a clutch between the engine and the electrical machine in order to disengage the machine from the engine when it is not required. Having such a clutch allows for electrical driving of the vessel (engine off mode). However, in an embodiment of the present invention, the electrical machine is directly coupled to the engine. Thus, in this embodiment, the propulsion arrangement does not have an engine off mode. The various control strategies outlined below can then be used to compensate for or take advantage of the fact that the machine is directly coupled to the engine.

Preferably the electrical machine is coupled to the engine without the use of separate bearings for the machine. For example, the rotor of the machine may be connected directly to the engine crankshaft. In this case the machine's rotor assembly may rely on the engine bearings and/or the transmission bearings to support the rotating mass. The machine's rotor assembly may then act in a similar way to an engine flywheel. This can allow the size and weight of the arrangement to be reduced in comparison to the case where the machine is not directly coupled to the engine, or where separate bearings are used.

The arrangement may further comprise an electrical storage means, and the machine may be arranged to charge the electrical storage means when it is operating as a generator. In this way it is possible for the electrical storage means to act as an alternative source of electrical power when the machine is not generating electricity. For example, the electrical storage means may be arranged to provide electrical power to the machine when it is operating as a motor. This can allow the machine to act as a motor using electrical energy which has been stored in the electrical storage means.

Preferably, onboard electrical power is provided selectively by the machine or the electrical storage means. For example, while the vessel is cruising, the engine may be running and electrical power may be supplied by the machine operating as a generator. Conversely, while the vessel is at anchor, the engine may be switched off and electrical power may be supplied by the electrical storage means. This can avoid the need to provide a separate generator set for supplying the onboard electrical power. This can allow much quieter operation while the vessel is at anchor, as well as a reduction in exhaust emissions and fuel consumption.

In order to facilitate the transfer of electrical power to or from the electrical storage means, the arrangement may further comprise means for selectively charging or discharging the electrical storage means.

Electrical machines typically generate an AC voltage when driven as generators. Thus the arrangement may further comprise an AC/DC converter, to convert an AC voltage generated by the machine to a DC voltage suitable for charging the electrical storage means and/or supplying onboard power. For example, the AC/DC converter may comprise a rectifier circuit. In order to allow the machine to operate selectively as a generator or a motor, the AC/DC converter may be bidirectional. This can allow the machine to produce DC power while operating as a generator, and to be driven by a DC supply when operating as a motor. Alternatively a separate AC/DC converter and DC/AC converter may be provided, and each may be connected to the machine when required.

In some circumstances it may be desirable to provide a DC bus having a substantially constant voltage, for example in order to provide a suitable onboard power supply. Thus the bidirectional AC/DC converter may be arranged to supply a DC bus when the machine is operating as a generator. A voltage regulator or DC/DC converter may be provided to ensure that the DC bus has the appropriate voltage.

The bidirectional AC/DC converter may be selectively operable as an inverter. This can allow the machine to be operated as a motor.

The arrangement may further comprise converter means for supplying onboard electrical power. For example, the converter means may be an inverter, or a DC/DC converter, for converting the DC bus to a suitable AC or DC voltage.

The arrangement may further comprise control means which control whether the machine operates as a generator or a motor. For example, the control means may selectively operate the bidirectional AC/DC converter as either an AC/DC converter or an inverter.

The arrangement may further comprise an engine battery, which is preferably not the same as the electrical storage means. In this way the engine battery can be used, for example, to start the engine even if the electrical storage means is depleted. Furthermore, the machine may be arranged to charge the engine battery when it is operating as a generator. This can allow the battery charging alternator which would normally be provided with the engine to be dispensed with, which may reduce the size and cost of the arrangement.

The machine may be operated as a motor in various different ways. In one example, the machine is arranged to assist the engine in propelling the vessel. For example, during periods of heavy acceleration, the machine may provide a power boost to allow higher acceleration. This can allow the engine to have a lower maximum power than would otherwise be required to achieve a certain maximum power output.

In another example, the machine is arranged to operate as a starter motor in order to start the engine. This also can allow a separate starter motor to be dispensed with, which may reduce the size and cost of the arrangement.

The amount of power provided by the machine when operating as a motor may be variable. For example, in some circumstances the machine may be lightly motored, in order to provide an essentially neutral load to the engine. In other circumstances the machine may provide a more substantial boost to the power of the engine, for example during periods of heavy acceleration. Thus the amount of mechanical power supplied by the machine may be varied to suit the circumstances.

Engines in marine vessels often generate significant amounts of vibration, particularly at low speeds. Where the engine is an internal combustion engine, this vibration is due to the discontinuous torque produced by the engine. For example, a single cylinder engine produces a single positive pulse of torque (and a smaller negative pulse of torque) for each engine cycle.

In an embodiment of the present invention, the machine is arranged to provide active damping of the engine torque. This may be achieved by arranging the machine to produce a torque which acts so as to reduce variations in the torque produced by the engine. In this way, it is possible for the machine to provide at least some smoothing of the discontinuous torque which is produced by the engine. This may reduce the amount of vibration generated by the engine, and may allow the engine to be operated at a lower speed than would otherwise be the case.

According to a second aspect of the present invention there is provided a propulsion arrangement for a marine vessel, comprising:

an engine for propelling the vessel;

an electrical machine coupled to the engine, the electrical machine being arranged to supply onboard electrical power for the vessel; and a control unit for controlling the electrical machine such that the electrical machine is selectively operable as a generator or a motor;

wherein the control unit and the electrical machine are arranged to provide active damping of the engine torque.

The electrical machine is preferably arranged to produce a torque which acts so as to reduce variations in the torque produced by the engine.

The amount of torque produced by the engine may be variable within an engine cycle (crank angle). Thus, in order to provide at least some damping of the variable engine torque, the amount of torque produced by the machine may be variable within one cycle of the engine at least one operating speed. Preferably the torque produced by the electrical machine is varied during an engine cycle so as to reduce variations in the torque produced by the engine during the engine cycle.

The amount of torque produced by the engine may be variable within a drive cycle. Thus, the amount of torque produced by the machine may be variable at an engine operating point along the drive cycle. The torque produced by the electrical machine may be varied based on engine speed so as to reduce torsional torque produced by the engine.

The amount of torque produced by the machine may be variable while the machine is acting as a generator, or a motor, or both. For example, the torque may vary such that the machine operates alternately as a generator and a motor (i.e. produces alternately negative and positive torque). The net effect may be that the machine presents a substantially neutral load overall (i.e. neither generates nor consumes power), or the machine may act as a net generator or a net motor.

The arrangement may further comprise means for measuring at least one engine parameter, such as speed or torque, and means for varying the torque of the machine in dependence on the measured parameter. This can allow the machine to produce a torque which acts so as to reduce variations in the torque produced by the engine. For example, the torque produced by the machine may have an amplitude and/or phase which varies with the speed of the engine. Alternatively or in addition the shape of the waveform of the torque produced by the machine may vary with the speed of the engine. By varying the torque of the machine in this way the optimum damping may be provided at each engine speed.

In some circumstances it may be desirable to retro-fit a vessel with a propulsion arrangement as described above. In such circumstances the engine bay will have been designed for an engine without an electrical machine, and this may limit the space available for the machine. Furthermore, even if the vessel is new, space is usually at a premium on a boat and thus there may be limited space available for the machine.

Propulsion arrangements for marine applications usually include a coupling between the engine and the propulsion mechanism. The aim of the coupling is to provide some flexing between the engine and the propulsion mechanism, to reduce vibration and to take up any temporary misalignment.

In an embodiment of the invention, the machine comprises a coupling integrated within the machine housing. This can allow the combination of the machine and coupling to take up less space than would otherwise be required. This may be particularly beneficial if a vessel is being retro-fitted with the propulsion arrangement.

The coupling may be a flexible coupling for reducing vibration between the engine and propulsion mechanism. For example, the coupling may comprise a coupling plate at least partially constructed from a semi-rigid material, such as rubber, polyurethane, or any similar material.

In any of the above arrangements the electrical machine may be a permanent magnet machine, or any other suitable machine. The machine may be single phase, three phase, or have any other number of phases, and may have any suitable number of poles. The engine may be an internal combustion engine, such as a petrol or diesel engine, or a gas turbine engine, or any other type of engine. The propulsion arrangement may comprise a single engine and machine, or two or more engines and/or machines.

The invention also extends to a marine vessel comprising a propulsion arrangement in any of the forms described above.

According to another aspect of the present invention there is provided a method of operating a propulsion arrangement for a marine vessel, the propulsion arrangement comprising an engine for propelling the vessel and an electrical machine coupled to the engine, the method comprising:
- operating the electrical machine selectively as a generator or a motor;
- supplying onboard electrical power from the electrical machine while the electrical machine is operating as a generator; and
- while the electrical machine is operating as motor, using the electrical machine to supplement the power of the engine while the engine is in operation.

According to another aspect of the present invention there is provided a method of operating a propulsion arrangement for a marine vessel, the propulsion arrangement comprising an engine for propelling the vessel and an electrical machine coupled to the engine, the method comprising:
- operating the electrical machine selectively as a generator or a motor;
- supplying onboard electrical power from the electrical machine while the electrical machine is operating as a generator; and
- operating the electrical machine to provide active damping of the engine torque.

Features of one aspect of the invention may be applied to any other aspect. Apparatus features may be provided as method features and vice versa.

Preferred features of the present invention will now be described, purely by way of example, with reference to the accompanying drawings, in which.

OVERVIEW

Figure 1:
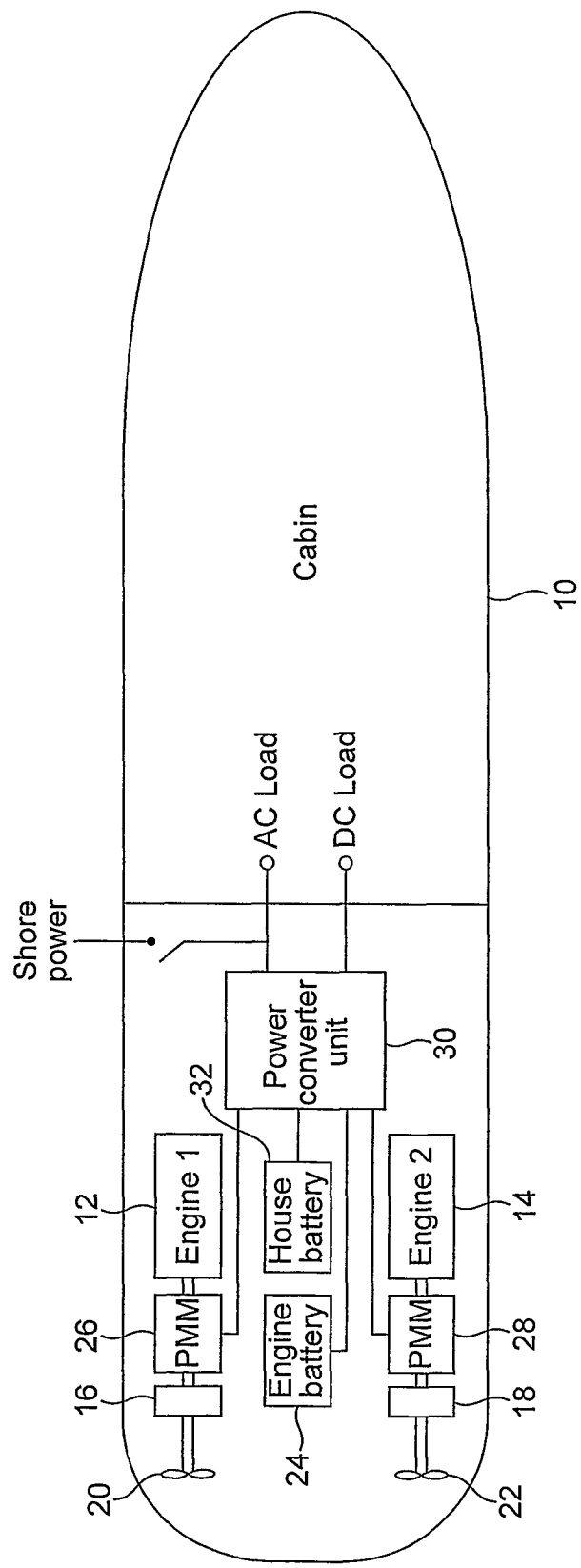
FIG. 1 shows an overview of a marine vessel according to an embodiment of the present invention.

FIG. 1 shows an overview of a marine vessel according to an embodiment of the present invention. Referring to FIG. 1, vessel 10 comprises a first engine 12 and a second engine 14. The first engine 12 is connected to coupling and gearbox 16 and propeller 20, while the second engine 14 is connected to coupling and gearbox 18 and propeller 22. An engine battery 24 is provided for supplying electrical power to the engines. The engines 12, 14 propel the vessel by driving the propellers 20, 22 via the coupling/gearboxes 16, 18. The engines 12, 14 operate under control of an engine management system, as is known in the art.

In the arrangement shown in FIG. 1, a first permanent magnet machine (PMM) 26 is connected to the first engine 12 between the engine and the coupling/gearbox 16, and a second permanent magnet machine 28 is connected to the second engine 14 between the engine and the coupling/gearbox 18. Each permanent magnet machine 26, 28 is electrically connected to a power converter unit 30.

In normal operation, each permanent magnet machine 26, 28 operates as a generator. In this mode of operation, the power converter unit 30 takes the variable frequency, variable voltage outputs of the machines and converts them to a substantially constant frequency, constant voltage AC output, for use as an onboard power supply. The power converter unit also provides a regulated DC supply for use by onboard DC equipment. In addition, the power converter unit is connected to the engine battery 24, and a house battery 32, and supplies the power for charging those batteries.

In the arrangement shown in FIG. 1, the permanent magnet machines 26, 28 are also operable as motors. In this mode of operation, the permanent magnet machines are supplied with electrical power from the battery 32. The permanent magnet machines then produce mechanical power, which supplements the power of the engines. This mode of operation will be explained in greater detail below.

Figure 2:
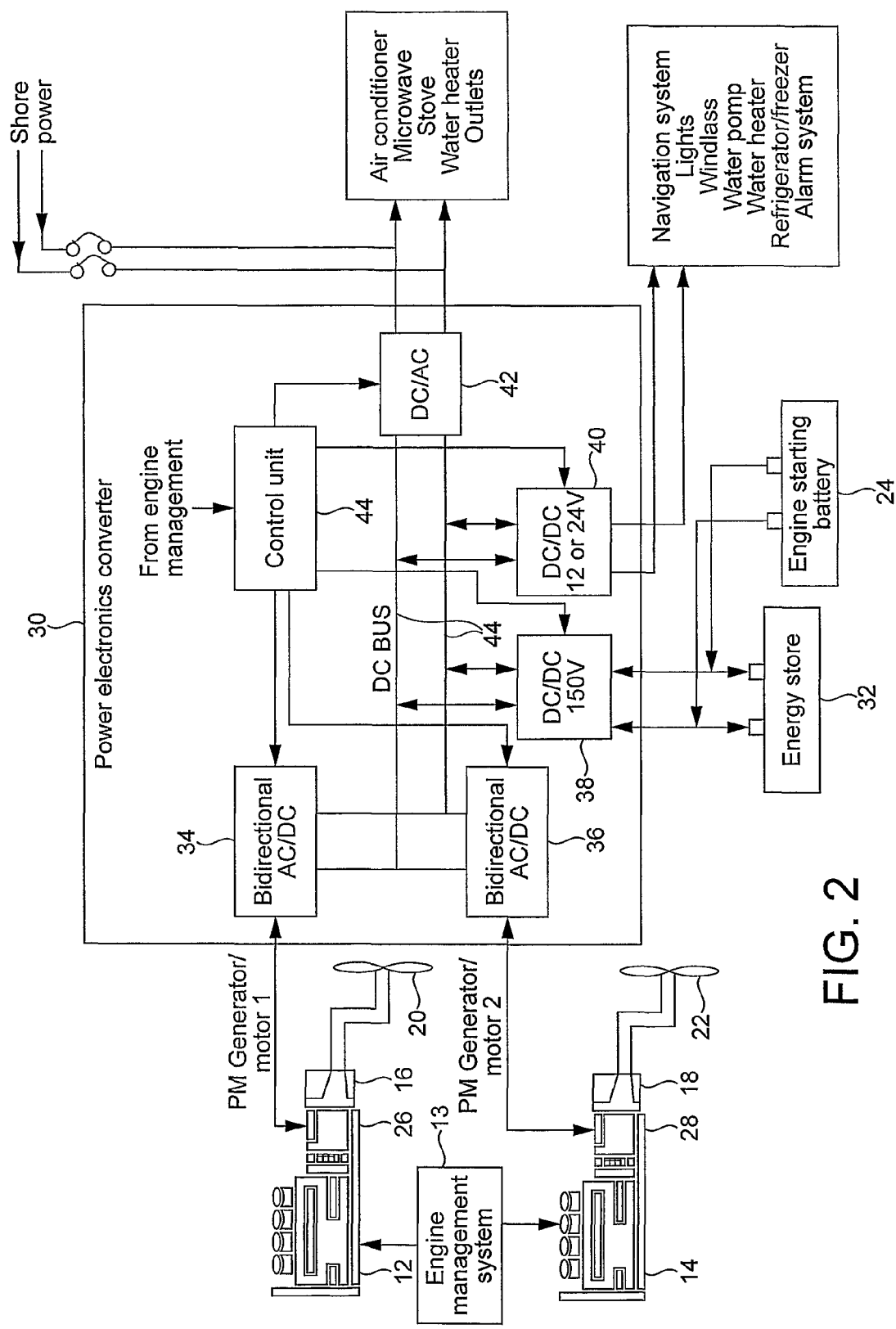
FIG. 2 shows in more detail parts of the propulsion arrangement of the vessel of FIG. 1.

FIG. 2 shows in more detail parts of the propulsion arrangement of the vessel of FIG. 1. As can be seen from FIG. 2, the power converter unit 30 comprises two bidirectional AC/DC converters 34, 36, a first DC/DC converter 38, a second DC/DC converter 40, and a DC/AC converter (inverter) 42. A control unit 44 controls the operation of the bidirectional converters 34, 36, the inverter 42 and the DC/DC converters 40, 42, as well as other components in the system. The control unit 44 receives a signal from the engine management system 13. The control unit 44 may also receive signals from any of the components and/or from other parts of the vessel. In addition, an energy storage device 32 (house batteries) and an engine starting battery 24 are provided.

The propulsion arrangement of FIGS. 1 and 2 is operable in four basic modes, which are referred to herein as cruising mode, anchor mode, power assist mode, and shore mode. Each of these modes is described below.

Cruising Mode

In the cruising mode, the engines 12, 14 are running, and drive the permanent magnet machines 26, 28 as well as the propellers 20, 22. Thus in this mode of operation each permanent magnet machine operates as a generator and generates an AC output. The AC outputs from the machines 26, 28 are fed to the respective AC/DC converters 34, 36. The AC/DC converters 34, 36 convert the variable voltage, variable frequency AC outputs from the machines 26, 28 into a stable DC voltage. This stable DC voltage is used to supply a DC bus 44. In this example the DC bus has a voltage of 200V, although other voltages could be used.

The inverter 42 is used to convert the DC bus voltage into an AC output having a substantially constant voltage and frequency, in order to supply the onboard AC equipment. In this example, the inverter 42 provides an 110V, 60 Hz AC output, although other voltages and frequencies could of course be used. The DC/DC converter 40 is used to convert the DC bus voltage to a lower DC voltage suitable for supplying the onboard DC equipment. In this example, the DC/DC converter 40 provides a 12V and/or 24V supply, although again other voltages could be used.

In the cruising mode, the DC bus 44 also supplies power to DC/DC converter 38. This DC/DC converter is used to charge up the energy storage device 32. In this example the energy storage device 32 is a battery pack consisting of 216 cells, and has a rated energy of 10 kWh. If the energy storage device 32 and the DC bus 44 have the same voltage, then it may be possible to dispense with the DC/DC converter 38.

In the arrangement of FIG. 2, the DC/DC converter 38 is also used to charge up the engine starting battery 24. Alternatively the DC/DC converter 40, or a separate converter, could be used to charge up the battery 24.

Anchor Mode

In the anchor mode the engines 12, 14 are switched off, and the permanent magnet machines 26, 28 do not generate any electrical power. In this mode, the energy storage device 32 supplies power to the DC bus 44. If the energy storage device 32 has a different voltage from the DC bus 44, then the DC/DC converter 38 converts the voltage of the energy storage device to that of the DC bus. Thus it will be appreciated that DC/DC converter 38, if present, is a bidirectional device.

In the anchor mode, the inverter 42 and DC/DC converter 40 operate in the same way as in the cruising mode for as long as the energy storage device 32 is able to supply the demanded power. This can allow the vessel to be supplied with onboard power without the need to run the engines 12, 14, and without the need for a separate generator set. Once the energy storage device 32 has discharged to a predetermined level, it is no longer possible for it to supply onboard power. In this case one or more of the engines 12, 14 can be started and used to drive one or more of the machines 26, 28, in order to supply the onboard power and charge up the energy storage device 32.

A separate engine starting battery 24 is provided, which is not used to provide the onboard power supply. In this way the engines 12, 14 can be started even when the energy storage device 32 is at a minimum state of charge.

As mentioned above, the engine starting battery 24 is charged by the machines 26, 28 via the DC bus 44. This can allow the battery charging alternator which would normally be provided with at least one of the engines 12, 16 to be dispensed with.

Power Assist Mode

In the power assist mode the permanent magnet machines 26, 28 operate as motors rather than as generators. In this mode the energy storage device 32 and/or the engine starter battery 24 supply electrical power to the machines 26, 28 via the bidirectional AC/DC converters 34, 36. The electrical power is used to drive the machines 26, 28, which then produce mechanical power. Possible ways in which the machines 26, 28 can be operated as motors include the following:

The machines 26, 28 can be used as starter motors to start the engines. This can dispense with the need for a separate starter motor, which can reduce the size and cost of the system.

The machines 26, 28 can be used to supplement the power produced by the engines at certain times. For example, during periods of heavy acceleration, the machines 26, 28 can provide a power boost to allow higher acceleration. This can allow the engines 12, 14 to be smaller than would otherwise be required to achieve a certain maximum power output.

The machines 26, 28 can be used to provide active damping of vibrations generated by the engines 12, 14. This can be achieved by operating the machines 26, 28 with a variable torque during each cycle of the engines. In this way the machines 26, 28 can reduce the impact of the discontinuous torque which is developed by the engines, particularly at low speed.

In the power assist mode, the control unit 44 shown in FIG. 2 receives a signal from the engine management system 13 indicating the amount and type of power assist that is required. The control unit 44 controls the bidirectional AC/DC converters 34, 36 such that they act as inverters in order to supply power from the DC bus 44 to the electrical machines 26, 28. By controlling the bidirectional AC/DC converters, the electrical machines 26, 28 can be controlled in order to provide the appropriate power assist to the engines 12, 14.

Shore Mode

In shore mode the engines 12, 14 are switched off, and power is supplied from the shore. The shore power is used for the onboard power supply, and to charge up the energy storage device 32 and battery 24.

Figure 3:
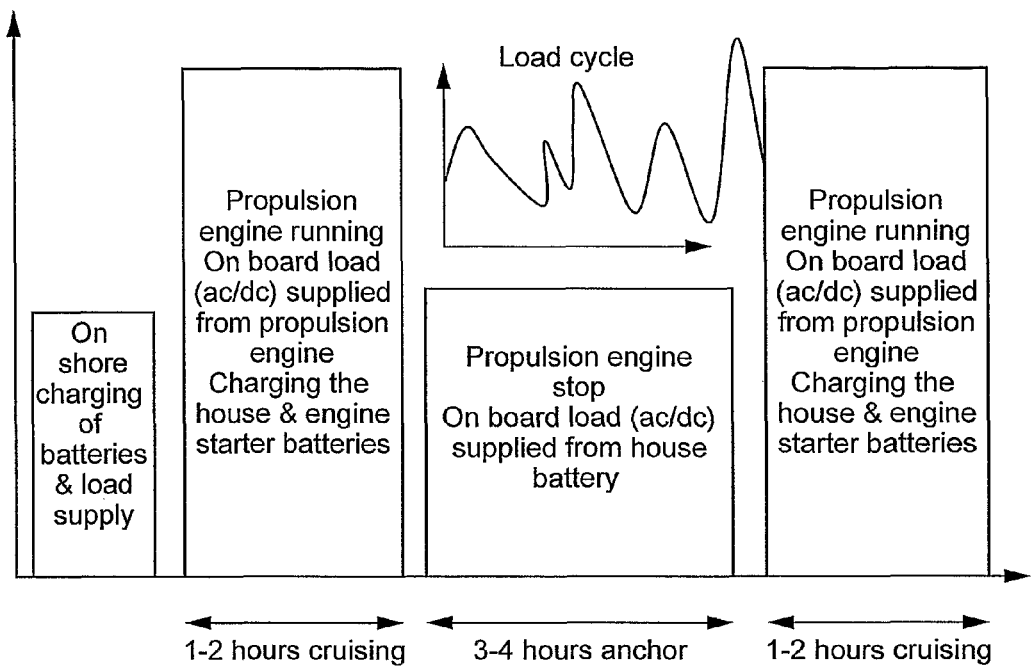
FIG. 3 shows a typical load cycle for a cruiser or yacht.

FIG. 3 shows a typical load cycle for a cruiser or yacht. As can be seen from FIG. 3, by using an energy storage device 32 with a high energy density (e.g. 10 kWh) it may be possible to supply the onboard electrical load from the energy storage device 32 for a period of 3-4 hours, for example. This can allow the vessel to be at anchor without the need to run the engines or a generator set. This can reduce fuel consumption and exhaust emissions, and create a quieter environment for the passengers and crew. Although a large energy storage device is needed for such operation, investigations carried out by the present applicant have revealed that, for typical applications, the size and cost of such a storage device can be less than that of the generator set which it replaces.

Active Damping

In one embodiment of the propulsion arrangement, the machines 26, 28 are operated with variable torque in order to provide active damping of vibrations generated by the engines 12, 14.

Figure 4:
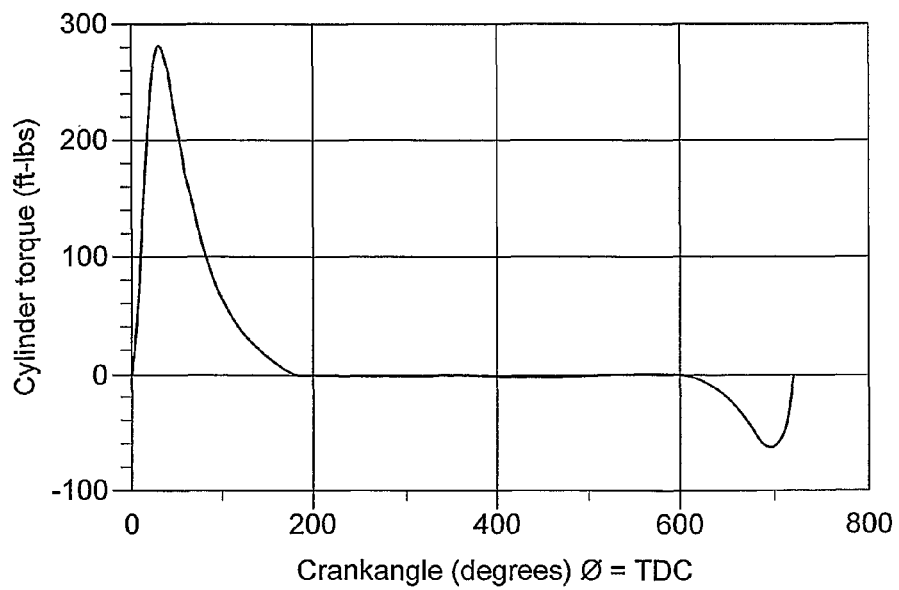
FIG. 4 shows the engine torque of a typical engine.

FIG. 4 shows the engine torque of a typical single cylinder two stroke engine during a complete engine cycle at 3600 rpm. As can be see from FIG. 4, a pulse of torque is produced once for every two cycles of the crankshaft. This pulse of torque corresponds to the combustion part of the engine cycle. In addition, a pulse of negative torque is produced during the compression part of the cycle.

Figure 5:
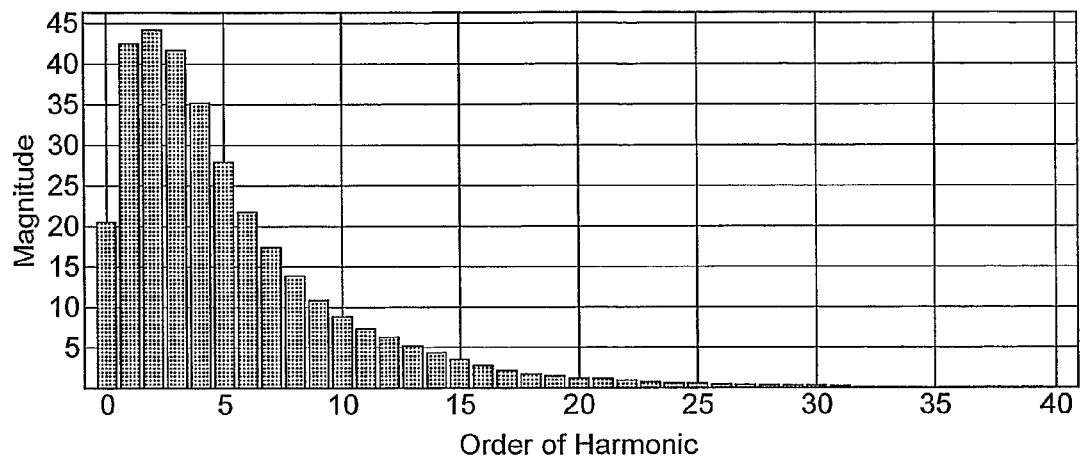
FIG. 5 shows the spectrum of the engine torque of a typical engine.
Figure 6:
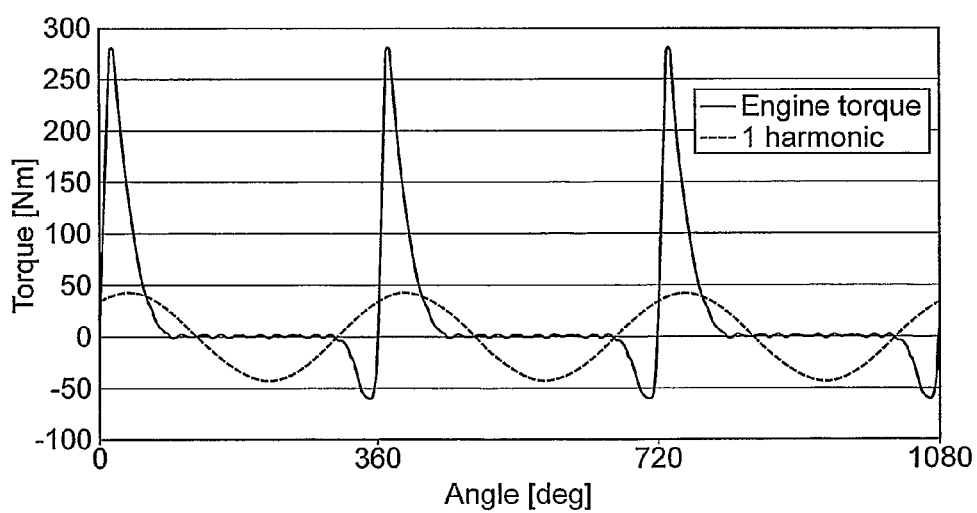
FIG. 6 shows the engine torque and its first harmonic over three engine cycles.

FIG. 5 shows the spectrum of the engine torque of a typical single cylinder engine. In FIG. 5 the first harmonic is equivalent to a complete engine cycle, and thus has a frequency equal to the engine speed (in rpm) divided by 120. FIG. 6 shows the engine torque and its first harmonic over three engine cycles.

In a marine application, the discontinuous pulses of torque produced by the engines may resonate with the body of the boat, producing vibrations. These vibrations may be particularly pronounced at low speeds, and may even limit the minimum speed of the engines. In order to reduce the vibrations produced by the engines 12, 14, the permanent magnet machines 26, 28 may be driven so as to produce a torque which dampens at least some of the harmonics of the engine torque.

Figure 7:
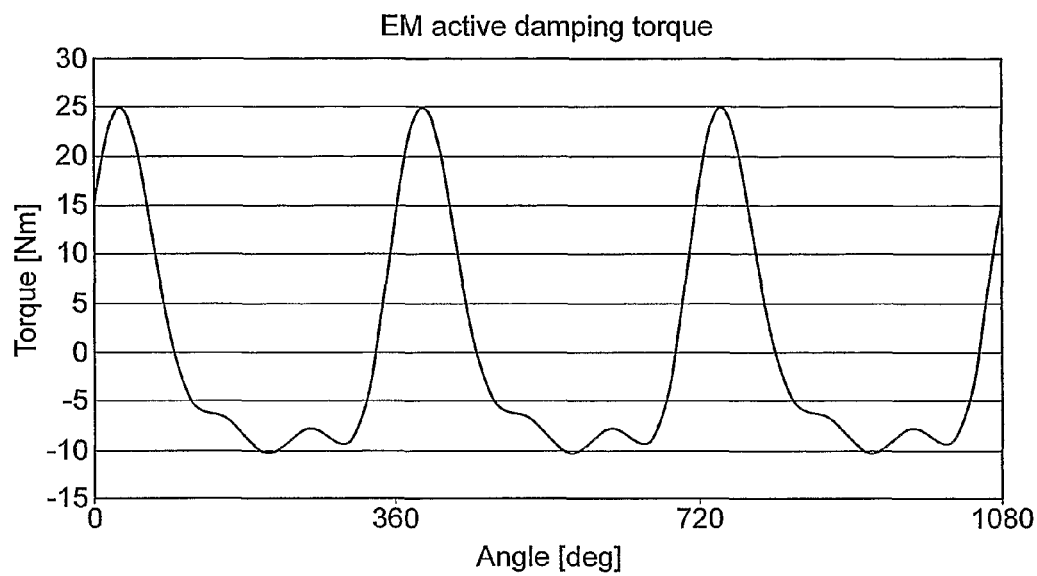
FIG. 7 shows an example of an active damping torque.

FIG. 7 shows an example of the active damping torque which is generated by one of the electrical machines 26, 28. In FIG. 7, the first harmonic is damped by 33%, the second harmonic by 17% and the third harmonic by 8%. In this example the first harmonic is damped the most, and the amount of damping is reduced with increasing harmonic number. This is because the system inertia acts as a low pass filter for the vibration, so higher harmonics are better damped by the inertia.

In FIG. 7 the machine produces positive torque during one part of the machine cycle, and negative torque during another part of the cycle. This means that the machine is operating alternately as a generator and a motor. In FIG. 7 the average torque is approximately zero. Thus the effect of applying the damping torque of FIG. 7 is to dampen the vibrations produced by the engine, but not to provide any power assist. Furthermore, since the machine operates partially as a generator and partial as a motor, the net effect is that electrical power is neither generated nor consumed, and the energy storage device 32 is neither charged nor discharged.

Figure 8:
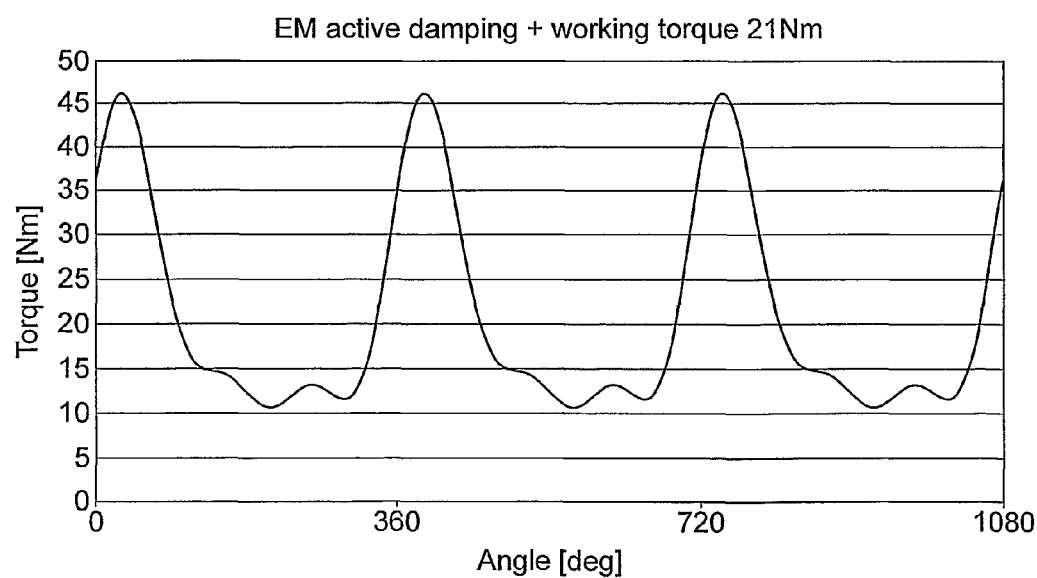
FIG. 8 shows an example of an active damping torque with the addition of a working torque.

If it is desired to provide some power assist to the engines, then the machines 26, 28 can be driven with a net positive torque. FIG. 8 shows an example of an active damping torque with the addition of a working torque of 21 Nm. In this example the machine is operating as a motor with a variable torque. In this way the machines 26, 28 can both damping vibrations, and provide working torque to the engines.

Conversely, if it is desired to charge the energy storage device 32 or the battery 24, then the machines 26, 28 can operate with a net negative torque, so that the net effect is to generate electrical power. However the torque may still vary within an engine cycle in order to dampen the vibrations.

It will be appreciated that the frequencies of the various harmonics produced by the machines 26, 28 will vary as the speed of the engines varies. Furthermore, the shape of the waveforms may also vary with speed. For example the amount of damping of each harmonic may be varied as the speed of the engine varies. In this way, the appropriate damping is provided at each engine speed.

FIGS. 7 and 8 show examples of active damping torque waveforms which are for use in damping the discontinuous pulses of torque produced by a single cylinder two stroke engine. In other embodiments the engine may have two or more cylinders, and may be four stroke, or of some other type. In this case the appropriate active damping torque waveform for the particular engine would be used, based on the variations in the torque over an engine cycle for that engine.

Figure 9:
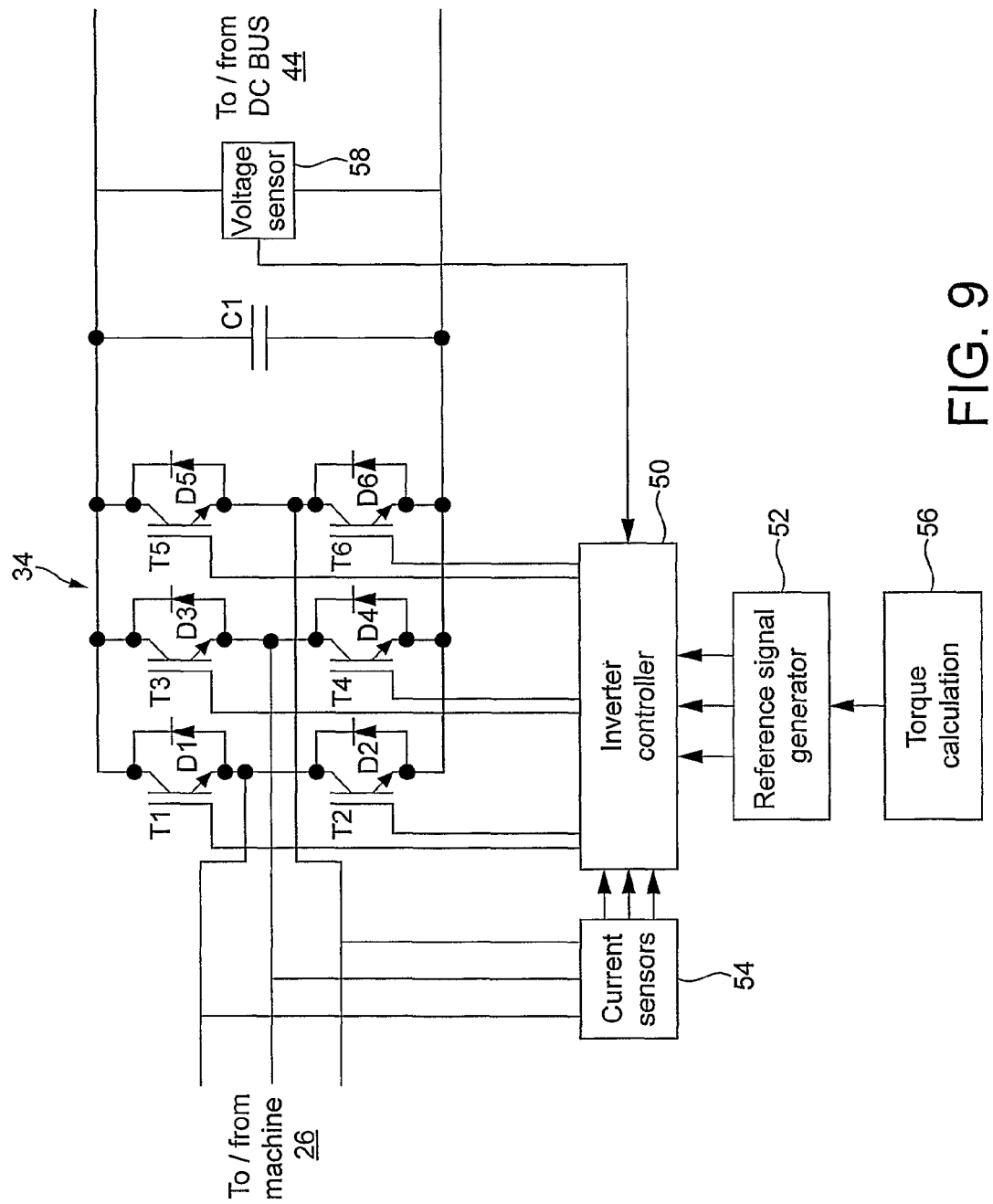
FIG. 9 shows parts of a bidirectional AC/DC converter.

FIG. 9 shows in more detail parts of the bidirectional AC/DC converter 34. The bidirectional AC/DC converter 38 is constructed in a similar way. In FIG. 9 it is assumed that the permanent magnet machine 26 is a three phase machine. The converter 34 is connected on one side to the three phase windings of the machine 26, and on the other side to the DC bus 44.

The bidirectional AC/DC converter 34 comprises transistors T1 to T6 and diodes D1 to D6. When the machine 26 is operating as a generator, the transistors T1 to T6 are switched off. In this mode, the diodes D1 to D6 operate as a three phase, full wave bridge rectifier to produce a rectified DC output. The rectified output is smoothed by capacitor C1 and fed to the DC bus 44. In this example the converter operates as an active rectifier and is able to produce a stable DC bus. If desired, a boost circuit (DC/DC converter) could be provided at the output of the AC/DC converter to supply the DC bus.

When the machine 26 is operating as a motor, the transistors T1 to T6 are controlled such that the converter 34 operates as an inverter. In this mode the converter 34 produces a three phase AC output which is fed to the machine 26 in order to drive it as a motor. The AC output for the first phase is produced by operation of the transistors T1 and T2, the AC output for the second phase is produced by operation of the transistors T3 and T4, and the AC output for the third phase is produced by operation of the transistors T5 and T6. Each pair of transistors operates by switching the voltage on the DC bus 44 to the respective output so as to produce the desired waveform at the output. The transistors T1 to T6 are operated under control of an inverter controller 50.

The inverter controller 50 receives three reference signals, representing the desired output frequency and voltage of each phase, which are provided by a reference signal generator 52. A current sensor 54 senses the output currents of each phase of the AC power output, and feeds the sensed currents to the inverter controller. The inverter controller 50 then controls the transistors T1 to T6 so that the three AC output signals substantially match the reference signals.

The inverter controller 50 and reference signal generator 52 shown in FIG. 9 may be part of the control unit 44 shown in FIG. 2. Further details of inverter operation can be found, for example, in commonly owned International patent application number WO 01/56133, the contents of which are incorporated herein by reference.

In the arrangement shown in FIG. 9, a torque calculation block 56 calculates the amount of torque which is required to dampen the vibrations produced by the engine. The torque calculation may be based on, for example, calculation of the engine average torque and measurement of the engine speed. The optimum active vibration torque amplitude and phase shift can be mapped during calibration on a calibration test-rig, and programmed in on a real system as a function of engine speed and average engine torque. An alternative method can be based on a dynamic regulator which can calculate actual active damping torque demand. Such a regulator employs a mathematical model to estimate cancellation torque online.

The torque calculation block 56 controls the reference signal generator 52 such that it generates reference signals having waveforms which will cause the machine 26 to actively dampen the torque of the engine. For example, the reference signal generator may generate waveforms such that the torque produced by the machine 26 resembles that shown in FIG. 7 or FIG. 8. In this way, the amplitude and phase of the active damping can vary as the speed of the engine varies, in order to provide the optimum damping at each speed.

Figure 10:
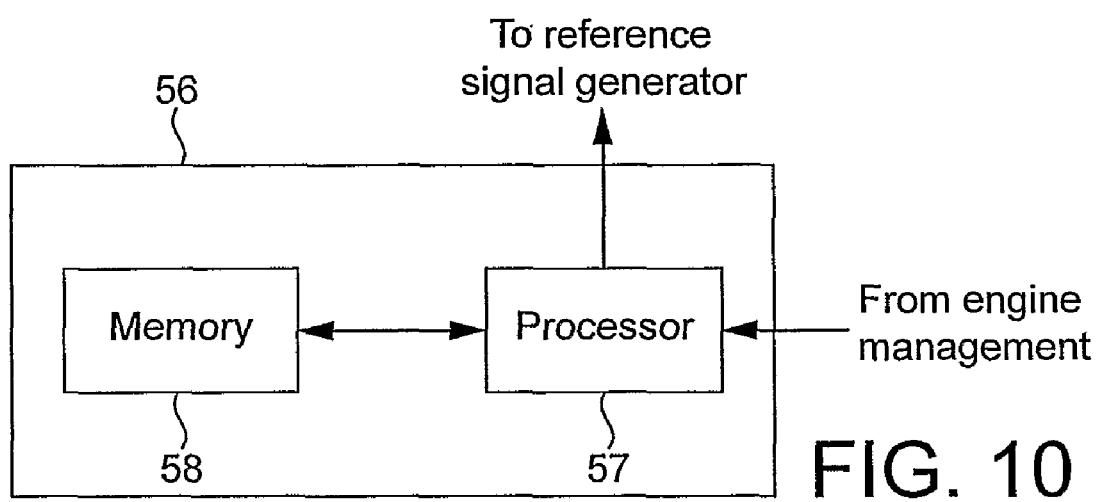
FIG. 10 shows parts of a torque calculation unit.

FIG. 10 shows parts of a torque calculation block 56 in one embodiment. In this embodiment the torque calculation block 56 comprises a processor 57 and memory 58. The memory 58 stores active damping torque waveforms, such as that shown in FIG. 7, for various different engine speeds. The processor 57 receives signals from the engine management system 13 which indicates the speed of the engine, as well as the type and amount of any power assist that is required. The processor retrieves the appropriate active damping torque waveform from the memory 58 based on the engine speed. The processor also modifies the waveform if necessary in order to produce a net positive torque, if power assist is required. The processor 57 then supplies the waveform to the reference signal generator 52 in FIG. 9, which uses the waveform to produce the appropriate reference signals for the inverter controller 50.

As noted above, the processor 57 may alternatively employ a mathematical model to calculate the appropriate active damping torque waveform in real time.

Integrated Coupling

In some circumstances it may be desirable to retro-fit a propulsion arrangement with a permanent magnet machine as described above. In such circumstances the engine bay will have been designed for an engine without such a machine, and this may limit the space available for the machine. Furthermore, even if the vessel is new, space is usually at a premium on a boat and thus there may be limited space available for the machine.

Propulsion arrangements for marine applications usually include a coupling between the engine and the propeller. The aim of the coupling is to provide some flexing between the engine and the propeller, to reduce vibration and to take up any temporary misalignment. The coupling normally comprises a coupling plate made at least partially of rubber or a similar material, which engages with a corresponding hard steel part.

In an embodiment of the invention, a permanent magnet machine for use in a propulsion arrangement includes a coupling plate integrated within the machine housing.

Figure 11:
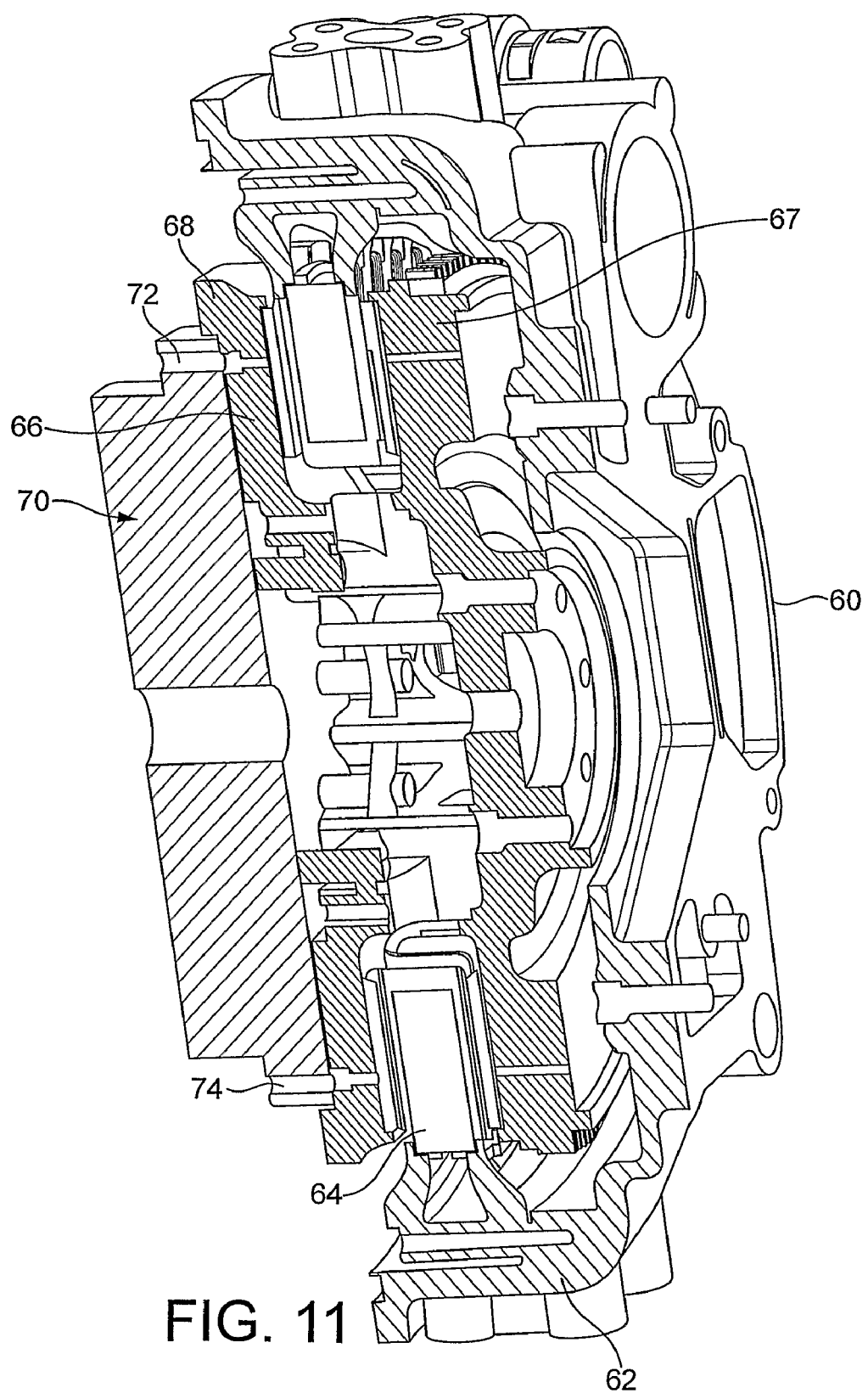
FIG. 11 shows a cut-away of part of a permanent magnet machine.

FIG. 11 shows a cut-away of part of a permanent magnet machine 60. Referring to FIG. 11, the machine 60 includes an outer housing 62, an annular stator 64, and a rotor 66. The rotor 66 comprises a co-axial pair of rotor discs 67, 68. Each rotor disc 67, 68 has a circular array of alternately polarised permanent magnets. The stator 64 consists of stator windings which are wound on an annular winding carrier between the rotor discs 67, 68. The stator windings are three phase windings arranged so that rotation of the rotor 66 relative to the stator 64 generates three phase AC outputs. The machine 60 is also operable as a motor by applying the appropriate AC voltage to the stator windings.

Integrated within the housing 62 is a coupling plate 70. The coupling plate is bolted to the rotor disk 67 through bolt holes 72, 74. The coupling plate fits at least partially into a space in the generator which would normally be provided for ventilation. The loss of ventilation which results can be compensated for by appropriate channeling of air from outside of the machine to the inside. The coupling plate 70 replaces the coupling plate which would otherwise be provided between the engine and the propeller. By integrating the coupling plate 70 within the machine housing, the overall length of the propulsion arrangement can be reduced, compared to the case where a separate machine and coupling are provided.

Figure 12:
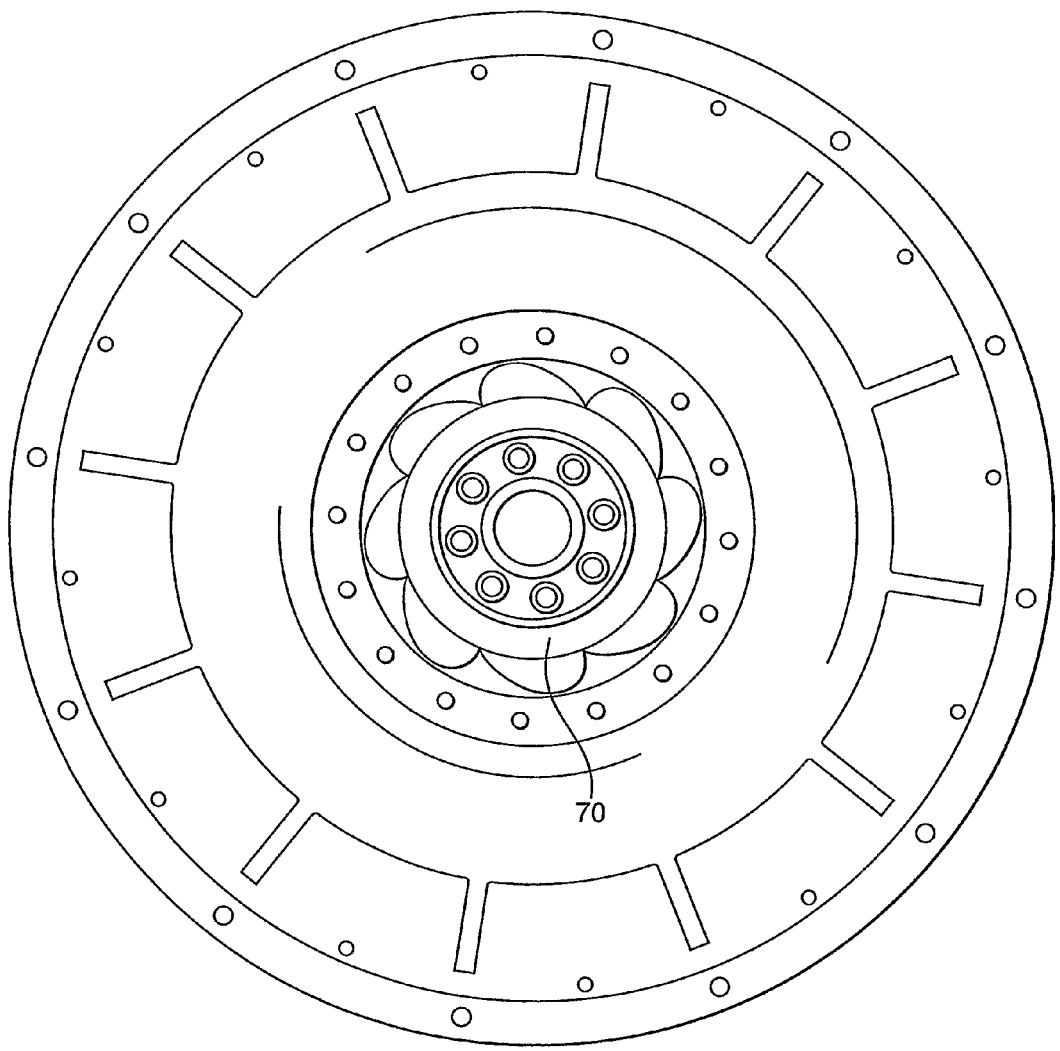
FIG. 12 shows an end view of the machine.

FIG. 12 shows an end view of the machine 60 with part of the housing removed. The coupling 70 consist of a contoured flexible disc moulded in tough yet resilient new type polyurethane. The contoured disc gives clearance for the bolt heads, and is able to flex freely to take up any temporary misalignment of the engine and shaft, due to flexing of the boat structure or the engine moving on its rubber vibration isolation mountings. Forward thrust is taken in compression on the disc between the two half couplings and reverse thrust is taken again in compression on the disc between the two fail straps. In the unlikely event of a disc failure the steel straps make the coupling fail safe and ensure drive is maintained in both forward and reverse. Thus the flexible coupling bolts between existing shaft flanges, is simple to install, reduces engine noise and vibration, and is fail safe.

Directly Coupled Machines

In an embodiment of the propulsion arrangement, the electrical machines 26, 28 are directly coupled to the respective engines 12, 14, and do not have separate bearings. The electrical machines employed in this configuration may be axial with a toroidally wound stator.

Figure 13:
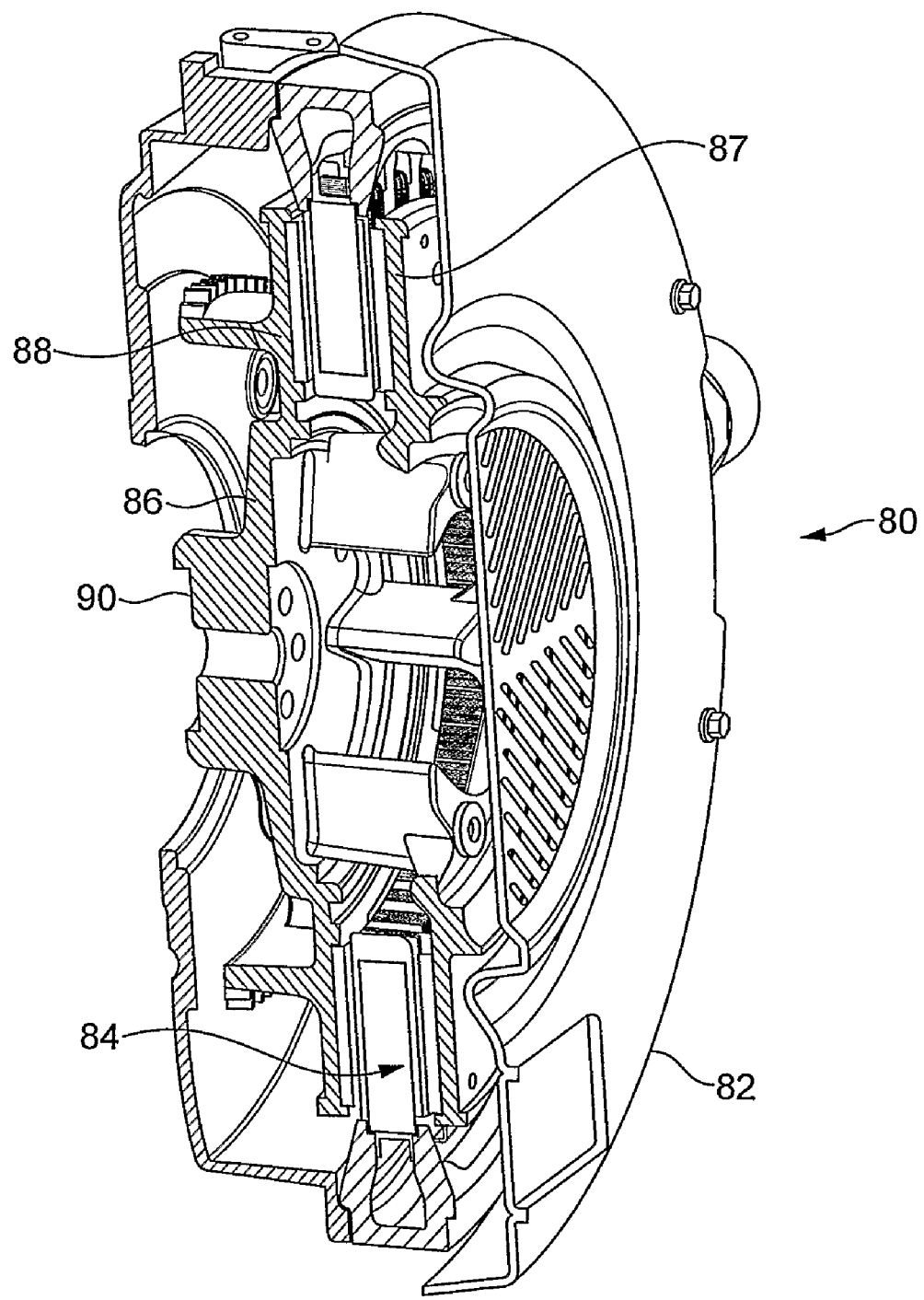
FIG. 13 shows parts of a machine with a bearing-less design.

FIG. 13 shows a cross section through a bearing-less axial flux machine 80. Referring to FIG. 11, the machine 80 includes an outer housing 82, an annular stator 84, and a rotor 86 comprising a co-axial pair of rotor discs 87, 88. Each rotor disc 87, 88 has a circular array of alternately polarised permanent magnets, which in this embodiment are axially polarized neodymium iron boron (NdFeB) magnets.

Each armature coil is wound toroidally round the stator core 84. The advantage of this winding arrangement is that it is very simple and lends itself to automatic winding. The three phase armature coils are formed on a slotless strip-wound stator. The unit shown in FIG. 13 is integrated into the flywheel housing and bolts directly onto the engine crankshaft by means of a drive end plate 90. Access to the crankshaft is via the opening at the front of the machine. The machine has no bearings and its rotating mass (the rotor assembly) is similar to an engine fly wheel.

In the arrangement shown in FIG. 13, the rotating mass is low, which allows the machine to be directly coupled to the engine without the need for separate bearings for the machine. Thus the machine relies on the engine bearings and the transmission bearings to support its rotating mass. This allows the engine and electrical machine to be compact and lightweight.

The various control arrangements described above facilitate the operation of an electrical machine which is directly coupled to the engine, without the need for a clutch to disengage the machine from the engine.

While a preferred embodiment having two engines and two electrical machines has been described, it will be appreciated that only a single engine and/or electrical machine need be provided. Other variations in detail will be apparent to the skilled person.

The invention claimed is:

1. A propulsion arrangement for a marine vessel, the propulsion arrangement comprising:
    an engine operable to propel the vessel;
    an electrical machine coupled to the engine, the electrical machine being arranged to supply onboard electrical power for the vessel;
    a bi-directional AC/DC converter connected to the electrical machine;
    an electrical storage connected to the bi-directional AC/DC converter; and
    a control unit which controls the electrical machine such that the electrical machine is selectively operable as a generator or a motor;
    wherein the electrical machine is arranged to charge the electrical storage when it is operating as a generator, and the electrical storage is arranged to provide electrical power to the electrical machine when it is operating as a motor;
    wherein the control unit and the electrical machine are arranged such that the electrical machine when operating as a motor supplements the power of the engine and provides active damping of engine torque.

2. An arrangement according to claim 1, wherein the electrical machine is arranged to produce a torque which acts so as to reduce variations in the torque produced by the engine.

3. An arrangement according to claim 1, wherein the amount of torque produced by the electrical machine is variable within one cycle of the engine at at least one operating speed.

4. An arrangement according to claim 1, wherein the torque produced by the electrical machine is varied during an engine cycle so as to reduce variations in the torque produced by the engine during the engine cycle.

5. An arrangement according to claim 1, further comprising means for measuring at least one engine parameter, and means for varying the torque of the electrical machine in dependence on the measured parameter.

6. An arrangement according to claim 5, wherein the parameter is engine speed or engine torque.

7. An arrangement according to claim 1, wherein the torque produced by the electrical machine has a frequency which varies with the speed of the engine.

8. An arrangement according to claim 1, wherein a waveform of the torque produced by the electrical machine varies with the speed of the engine.

9. An arrangement according to claim 1, further comprising a machine housing, wherein the electrical machine comprises a coupling integrated within the machine housing.

10. An arrangement according to claim 9, wherein the coupling is a flexible coupling for reducing vibration between the engine and a propulsion mechanism.

11. An arrangement according to claim 9, wherein the coupling comprises a coupling plate at least partially constructed from a semi-rigid material.

12. An arrangement according to claim 1, wherein the electrical machine is a permanent magnet machine.

13. A marine vessel comprising a propulsion arrangement, the propulsion arrangement comprising:
   an engine operable to propel the vessel;
   an electrical machine coupled to the engine, the electrical machine being arranged to supply onboard electrical power for the vessel;
   a bi-directional AC/DC converter connected to the electrical machine;
   an electrical storage connected to the bi-directional AC/DC converter; and
   a control unit which controls the electrical machine such that the electrical machine is selectively operable as a generator or a motor;
   wherein the electrical machine is arranged to charge the electrical storage when it is operating as a generator, and the electrical storage is arranged to provide electrical power to the electrical machine when it is operating as a motor;
   wherein the control unit and the electrical machine are arranged such that the electrical machine when operating as a motor supplements the power of the engine and provides active damping of engine torque.

14. A method of operating a propulsion arrangement for a marine vessel, the propulsion arrangement comprising an engine for propelling the vessel, an electrical machine coupled to the engine, a bi-directional AC/DC converter connected to the electrical machine and an electrical storage connected to the bi-directional AC/DC converter, the method comprising:
   operating the electrical machine selectively as a generator or a motor;
   supplying onboard electrical power from the electrical machine while the electrical machine is operating as a generator;
   charging the electrical storage with the electrical machine when the electrical machine is operating as a generator;
   providing electrical power from the electrical storage to the electrical machine when the electrical machine is operating as a motor;
   supplementing the power of the engine and providing active damping of engine torque when operating the electrical machine as a motor.

* * * * *